(12) United States Patent
An et al.

(10) Patent No.: US 9,756,325 B1
(45) Date of Patent: Sep. 5, 2017

(54) NOISE DETECTION DEVICE OF DISPLAY MODULE AND NOISE DETECTION METHOD

(71) Applicant: Wuhan China Star Optoelectronics Technology Co., Ltd., Wuhan, Hubei (CN)

(72) Inventors: Taisheng An, Wuhan (CN); Jinjie Zhou, Wuhan (CN); Xiang Yang, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 15/175,682

(22) Filed: Jun. 7, 2016

(30) Foreign Application Priority Data

Apr. 20, 2016 (CN) .......................... 2016 1 0247073

(51) Int. Cl.
| | |
|---|---|
| H04N 17/00 | (2006.01) |
| H04N 17/02 | (2006.01) |
| H04N 17/04 | (2006.01) |
| H04N 7/01 | (2006.01) |
| H04N 3/12 | (2006.01) |
| G09G 3/00 | (2006.01) |

(52) U.S. Cl.
CPC ........... *H04N 17/045* (2013.01); *G09G 3/006* (2013.01); *H04N 3/127* (2013.01); *H04N 7/01* (2013.01); *G09G 2352/00* (2013.01)

(58) Field of Classification Search
USPC .......... 348/189, 180, 193, 130, 211.6, 231.3, 348/241, 247, 410.1, 423.1, 429.1, 460, 348/470, 474, 500, 512, 515, 516, 522, 348/523, 533, 535, 567, 607, 608, 606, 348/627, 676, 683; 345/165, 213, 211, 345/505, 519, 534, 562, 605, 604, 686, 345/691
See application file for complete search history.

(56) References Cited

U.S. PATENT DOCUMENTS 4,688,100 A * 8/1987 Haganuma .............. G06T 9/005
  382/239
5,974,464 A * 10/1999 Shin ....................... G09G 5/006
  341/58

(Continued)

*Primary Examiner* — Jefferey F Harold
*Assistant Examiner* — Mustafizur Rahman

(57) ABSTRACT

A noise detection device of a display module, including: a storage module, a processing module and an encoding module; the storage module is used to store parallel video data, the processing module is used to transmit the stored parallel video data to the encoding module, the encoding module is used to convert the stored parallel video data into serial video data through encoding and to transmit the converted serial video data to a timing controller of a display module; the processing module is used to receive mini-LVDS data generated by the timing controller based on the converted serial data, and to convert the mini-LVDS data into the parallel video data; the processing module is used to compare the stored parallel video data with the converted parallel video data, and to determine whether the display module is qualified for noise control according to the comparison result.

10 Claims, 2 Drawing Sheets

(56) References Cited

U.S. PATENT DOCUMENTS

| | | | | |
|---|---|---|---|---|
| 6,011,870 A | * | 1/2000 | Jeng | G06T 7/2026 375/240.16 |
| 2003/0117350 A1 | * | 6/2003 | Jun | G09G 3/3685 345/87 |
| 2004/0150721 A1 | * | 8/2004 | Matsuda | H04N 17/04 348/189 |
| 2005/0038661 A1 | * | 2/2005 | Momosaki | G10L 25/00 704/275 |
| 2005/0179682 A1 | * | 8/2005 | Shin | G09G 3/3406 345/207 |
| 2005/0243029 A1 | * | 11/2005 | Kang | G09G 3/22 345/74.1 |
| 2006/0044479 A1 | * | 3/2006 | Heo | H04N 5/445 348/738 |
| 2007/0230579 A1 | * | 10/2007 | Shen | H04N 19/70 375/240.16 |
| 2010/0289839 A1 | * | 11/2010 | Min | G09G 3/3648 345/691 |
| 2010/0309392 A1 | * | 12/2010 | Chen | G09G 3/3688 348/790 |
| 2011/0037746 A1 | * | 2/2011 | Kim | G09G 3/3611 345/211 |
| 2011/0117854 A1 | * | 5/2011 | Ruelke | H04B 3/30 455/63.1 |
| 2012/0212401 A1 | * | 8/2012 | Bae | G09G 3/3648 345/88 |
| 2014/0176412 A1 | * | 6/2014 | Oh | G09G 3/3611 345/99 |
| 2014/0184905 A1 | * | 7/2014 | Mountain | H04N 21/4884 348/384.1 |
| 2015/0028193 A1 | * | 1/2015 | Fujinuma | G02B 21/0084 250/214.1 |

* cited by examiner

NOISE DETECTION DEVICE OF DISPLAY MODULE AND NOISE DETECTION METHOD

CROSS-REFERENCE TO RELATED APPLICATIONS

This application claims priority to CN application 201610247073.X filed on, Apr. 20, 2016, the disclosure of which is incorporated in its entirety by reference herein.

TECHNICAL FIELD

The present disclosure relates to detection technical field, and more particularly, to a noise detection device of a display module and a noise detection method.

BACKGROUND

With the evolution of photoelectric and semiconductor technology, the flat panel display has been developed rapidly, and among various flat panel displays, the liquid crystal display (LCD) has been applied to all aspects of production and life since it has many advantages, such as high space utilization efficiency, low power consumption, zero radiation and low electromagnetic interference.

Before a liquid crystal display leaves the factory, noise detection is normally required to be performed on the liquid crystal display, so as to determine whether the liquid crystal display is a qualified product. Therefore, a noise detection device is needed to perform noise detection on the liquid crystal display before leaving the factory.

SUMMARY

In order to achieve the above purpose, the present disclosure provides a noise detection device of a display module, including: a storage module, a processing module and an encoding module; the storage module is used to store parallel video data, the processing module is used to transmit the stored parallel video data to the encoding module, the encoding module is used to convert the stored parallel video data into serial video data through encoding and to transmit the converted serial video data to a timing controller of a display module; the processing module is used to receive mini-LVDS data generated by the timing controller based on the converted serial data, and to convert the mini-LVDS data into the parallel video data; the processing module is used to compare the stored parallel video data with the converted parallel video data, and to determine whether the display module is qualified for noise control according to the comparison result.

Furthermore, the processing module includes a field-programmable gate array.

Furthermore, the storage module includes a synchronous dynamic random access memory, and the encoding module includes a digital video imaging encoding chip.

Furthermore, a result of comparing the stored parallel video data with the converted parallel video data is a percentage of bit error rate of the converted parallel video data; wherein the processing module is used to determine whether the display module is qualified for noise control based on the percentage of bit error rate of the converted parallel video data.

The present disclosure provides a noise detection method of a display module, including: converting the stored parallel video data into serial video data through encoding and to transmit the converted serial video data to a timing controller of a display module; receiving mini-LVDS data generated by the timing controller based on the converted serial data, and converting the mini-LVDS data into the parallel video data; comparing the converted parallel video data with the stored parallel video data and determining whether the display module is qualified for noise control according to the comparison result.

Furthermore, the method of converting the stored parallel video data into serial video data through encoding and transmitting the converted serial video data to a timing controller of a display module includes: transmitting the parallel video data stored in the storage module to the encoding module by using the processing module; converting the stored parallel video data into serial video data through encoding by using the encoding module, and transmitting the converted serial video data to a timing controller of a display module by using the encoding module.

Furthermore, mini-LVDS data generated by the timing controller are received based on the converted serial data by using the processing module, and the mini-LVDS data are converted into the parallel video data by using the processing module.

Furthermore, the converted parallel video data are compared with the stored parallel video data by using the processing module, and whether the display module is qualified for noise control is determined according to the comparison result by using the processing module.

Furthermore, a result of comparing the stored parallel video data with the converted parallel video data is a percentage of bit error rate of the converted parallel video data; wherein the method of determining whether the display module is qualified for noise control according to the comparison result includes: determining whether the display module is qualified for noise control based on the percentage of bit error rate of the converted parallel video data.

The advantageous effect of the present disclosure is as follows: The present disclosure provides a noise detection device of a display module and a noise detection method to implement noise detection on a display module before leaving the factory, in order to determine whether the display module is qualified before leaving the factory.

BRIEF DESCRIPTION OF THE DRAWINGS

These and/or other aspects, features and advantages of the invention will become apparent and more readily appreciated from the following description of the embodiments, taken in conjunction with the accompanying drawings in which.

DETAILED DESCRIPTION

Here, embodiments of the present invention will be described in detail below by referring to the accompany drawings. However, the present invention may be implemented in many different ways, and should not be interpreted as being limited to the specific embodiment set forth herein. Instead, these embodiments are provided for explaining the principle and actual application of the present invention, thus other skilled in the art can understand various embodiments and amendments which are suitable for specific intended applications of the present invention.

Figure 1:
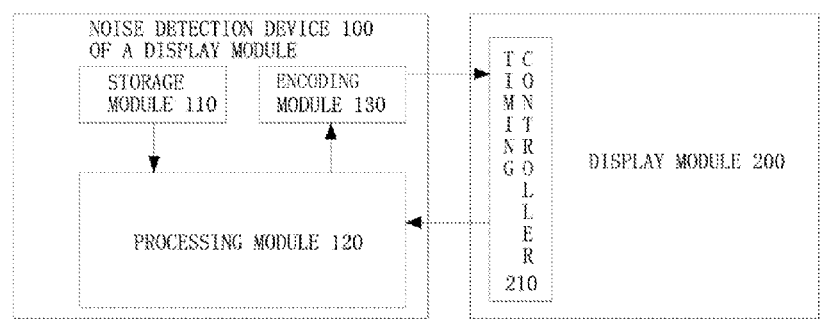
FIG. 1 is a block diagram of a noise detection device of a display module according to an embodiment of the present disclosure.

FIG. 1 is a block diagram of a noise detection device of a display module according to an embodiment of the present disclosure.

Referring to FIG. 1, a noise detection device 100 of a display module according to an embodiment of the present disclosure includes: a storage module 110, a processing module 120 and an encoding module 130.

The storage module 110 stores an original parallel video data, such as the original parallel R, G, B data. In the present embodiment, the storage module 110 may be a synchronous dynamic random access memory (SDRAM), but the present disclosure is not limited thereto.

The processing module 120 transmits the stored parallel video data to the encoding module 130. After receiving the stored parallel video data, the encoding module 130 converts the stored parallel video data into serial video data through encoding. The encoding module 130 transmits the converted serial video data to a timing controller 210 of a display module 200.

After receiving the converted serial video data, the timing controller 210 of the display module 200 processes the converted serial video data into the mini-LVDS data. Here, the mini-LVDS data are normally provided as display data to the respective pixels on the display panel. In the present embodiment, the timing controller 210 also returns the mini-LVDS data to the processing module 120.

After receiving the mini-LVDS data, the processing module 120 converts the mini-LVDS data into the parallel video data. The processing module 120 compares the stored parallel video data with the converted parallel video data, and determines whether the display module 200 is qualified for noise control according to the comparison result.

Furthermore, the processing module 120 compares the stored parallel video data with the converted parallel video data, in order to determine a percentage of bit error rate of the converted parallel video data. The processing module 120 determines whether the display module is qualified for noise control based on the percentage of bit error rate of the converted parallel video data.

For example, a threshold value may be set. When the percentage of bit error rate of the converted parallel video data is not less than the threshold value, it may be determined that the display module 200 is not qualified for noise control; when the percentage of bit error rate of the converted parallel video data is less than the threshold value, it may be determined that the display module 200 is qualified for noise control.

In the present embodiment, the processing module 120 may be a field-programmable gate array (FPGA), but the present disclosure is not limited thereto, and the processing module 120 may also be other proper types of processing chips. In the present embodiment, the encoding module 130 may be a digital video imaging (DVI) encoding chip, but the present disclosure is not limited thereto, and the encoding module 130 may also be other proper types of encoding chips.

Figure 2:
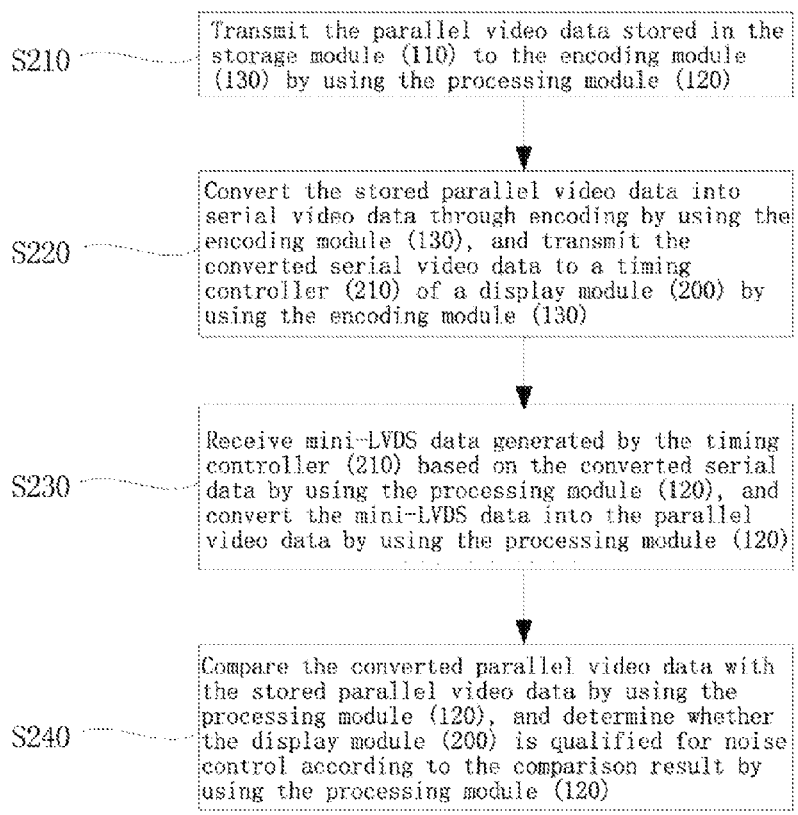
FIG. 2 is a flow diagram of a noise detection method of a display module according to an embodiment of the present disclosure.

FIG. 2 is a flow diagram of a noise detection method of a display module according to an embodiment of the present disclosure.

Referring to FIGS. 1 and 2, in step S210, the parallel video data stored in the storage module 110 are transmitted to the encoding module 130 by using the processing module 120.

In step S220, the stored parallel video data are converted into serial video data through encoding by using the encoding module 130, and the converted serial video data are transmitted to a timing controller 210 of a display module 200 by using the encoding module 130.

In step S230, mini-LVDS data generated by the timing controller 210 are received based on the converted serial data by using the processing module 120, and the mini-LVDS data are converted into the parallel video data by using the processing module 120. Here, after receiving the converted serial video data, the timing controller 210 of the display module 200 processes the converted serial video data into the mini-LVDS data. Here, the mini-LVDS data are normally provided as display data to the respective pixels on the display panel. In the present embodiment, the timing controller 210 also returns the mini-LVDS data to the processing module 120.

In step S240, the converted parallel video data are compared with the stored parallel video data by using the processing module 120, and whether the display module 200 is qualified for noise control is determined according to the comparison result by using the processing module 120.

Here, the processing module 120 is used to compare the stored parallel video data with the converted parallel video data, in order to determine a percentage of bit error rate of the converted parallel video data. The processing module 120 is used to determine whether the display module is qualified for noise control based on the percentage of bit error rate of the converted parallel video data.

For example, a threshold value may be set. When the percentage of bit error rate of the converted parallel video data is not less than the threshold value, it may be determined that the display module 200 is not qualified for noise control; when the percentage of bit error rate of the converted parallel video data is less than the threshold value, it may be determined that the display module 200 is qualified for noise control.

As mentioned above, according to an exemplary embodiment of the present disclosure, a noise detection device of a display module and a noise detection method are provided to perform noise detection on the display module before leaving the factory, in order to determine whether the display module is qualified before leaving the factory.

Although the present invention is described with reference to the special exemplary embodiment, while those skilled in the art will understand: various changes in form and details may be made therein without departing from the spirit and scope of the invention as defined by the appended claims and its equivalents.

What is claimed is:

1. A noise detection device of a display module, comprising:
   a digital data storage,
   a processor, and
   an encoder;
   the digital data storage is used to store parallel video data, the processor is used to transmit the stored parallel video data to the encoder, the encoder is used to convert the stored parallel video data into serial video data through encoding and to transmit the converted serial video data to a timing controller of a display module;
   the processor is used to receive mini-LVDS data generated by the timing controller based on the converted serial data, and to convert the mini-LVDS data into the parallel video data; the processor is used to compare the stored parallel video data with the converted parallel video data, and to determine whether the display module is qualified for noise control according to the comparison result.

2. The noise detection device of claim 1, wherein the processor includes a field-programmable gate array.

3. The noise detection device of claim 1, wherein the digital data storage includes a synchronous dynamic random access memory, and the encoder includes a digital video imaging encoding chip.

4. The noise detection device of claim 1, wherein a result of comparing the stored parallel video data with the converted parallel video data is a percentage of bit error rate of the converted parallel video data;
   wherein the processor determines whether the display module is qualified for noise control based on the percentage of bit error rate of the converted parallel video data.

5. A noise detection method of a display module, comprising;
   converting stored parallel video data into serial video data through encoding and transmitting the converted serial video data to a timing controller of a display module;
   receiving mini-LVDS data generated by the timing controller based on the converted serial data, and converting the mini-LVDS data into parallel video data; and
   comparing the converted parallel video data with the stored parallel video data and determining whether the display module is qualified for noise control according to the comparison result.

6. The noise detection method of claim 5, wherein the method of converting the stored parallel video data into serial video data through encoding and transmitting the converted serial video data to a timing controller of a display module further comprises:
   transmitting the parallel video data stored in a digital data storage to an encoder using a processor; and
   converting the stored parallel video data into serial video data through encoding by using the encoding module, and transmitting the converted serial video data to a timing controller of a display module by using the encoder.

7. The noise detection method of claim 6, further comprises: receiving mini-LVDS data generated by the timing controller based on the converted serial data by using the processor, and converting the mini-LVDS data into the parallel video data by using the processor.

8. The noise detection method of claim 6, further comprises: comparing the converted parallel video data with the stored parallel video data by using the processor, and determining whether the display module is qualified for noise control according to the comparison result by using the processor.

9. The noise detection method of claim 6, wherein the processor includes a field-programmable gate array, the digital data storage includes a synchronous dynamic random access memory, and the encoder includes a digital video imaging encoding chip.

10. The noise detection method of claim 5, wherein a result of comparing the stored parallel video data with the converted parallel video data is a percentage of bit error rate of the converted parallel video data, wherein the method of determining whether the display module is qualified for noise control according to the comparison result further comprises:
   determining whether the display module is qualified for noise control based on the percentage of bit error rate of the converted parallel video data.

* * * * *